United States Patent

Wiemer et al.

[11] Patent Number: 5,872,557
[45] Date of Patent: Feb. 16, 1999

[54] PORTABLE ELECTRONIC DEVICE

[75] Inventors: Karl-Heinz Wiemer, Ettlingen; Thorsten Kobbelt; Ewald Göbel, both of Karlsruhe, all of Germany

[73] Assignee: IBP Pietzsch GmbH, Ettlingen, Germany

[21] Appl. No.: 633,488

[22] Filed: Apr. 17, 1996

Related U.S. Application Data

[63] Continuation of Ser. No. 202,170, Feb. 25, 1994, abandoned.

[30] Foreign Application Priority Data

Feb. 25, 1993 [DE] Germany .......................... 43 05 857.4
Oct. 5, 1993 [DE] Germany .......................... 93 15 094 U

[51] Int. Cl.⁶ ...................................................... G09G 5/00
[52] U.S. Cl. ...................... 345/156; 345/905; 364/708.1; 361/683
[58] Field of Search ..................................... 345/173, 905, 345/179, 970, 961, 156; 364/443, 708.1; 361/683

[56] References Cited

U.S. PATENT DOCUMENTS

| | | | |
|---|---|---|---|
| 4,345,147 | 8/1982 | Aaron | 364/708.1 |
| 4,596,021 | 6/1986 | Carter | 375/5 |
| 4,640,988 | 2/1987 | Robinton | 379/90 |
| 5,139,838 | 8/1992 | Baum | 428/72 |
| 5,161,242 | 11/1992 | Boulay | 364/443 |
| 5,175,672 | 12/1992 | Conner | 345/905 |
| 5,212,628 | 5/1993 | Bradbury | 361/683 |
| 5,226,540 | 7/1993 | Bradbury | 364/708.1 |
| 5,268,844 | 12/1993 | Carver | 364/443 |
| 5,313,596 | 5/1994 | Swindler | 364/708.1 |
| 5,430,607 | 7/1995 | Smith | 361/683 |

Primary Examiner—Richard A. Hjerpe
Assistant Examiner—Kent Chang
Attorney, Agent, or Firm—Rogers & Killeen

[57] ABSTRACT

A portable electronic device for orientation and communication comprises a casing (2) which includes a portable computer (8) with an integrated operating surface (10), communication means comprising electronic assemblies for wireless communication with identical or similar devices, and a docking station (6) for electrically connecting the computer to the communication means and the electronic assemblies and for mechanical retention. The computer (8) and the electronic assemblies are housed in the casing to be protected against outside influences and the computer is designed to be removable from the casing for operation independently of the device.

7 Claims, 10 Drawing Sheets

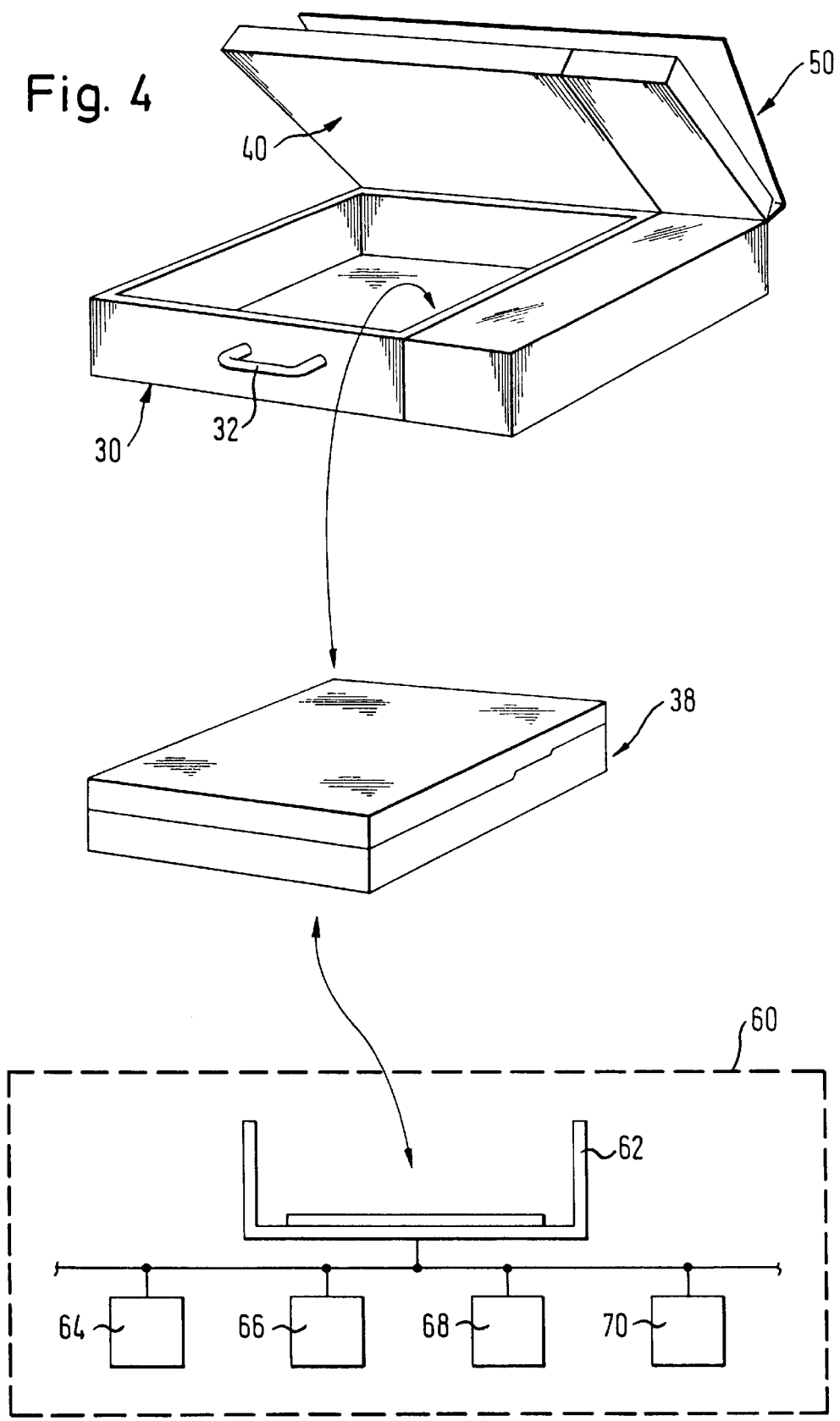

Fig. 11

| Symbol | main function leadership support | TS | TB |
|---|---|---|---|
| ESC | abort processing of current function | ESC | — |
| Pers | personnel status form sheet is indicated on display and can be processed | F1 | — |
| Log | logistics form sheet (fuels) is indicated on display and can be processed | F2 | — |
| Mat | materials form sheet (equipment) is indicated on display and can be processed | F3 | — |
| San | ambulance service form sheet is indicated on display and can be processed | F4 | — |
| Text | free text form sheet is indicated on display and can be processed | F5 | — |
| ⧉ | shift map in image portion | F6 | X |
| ▣ | select maps and fix map scale | F7 | X |
| ⚡OK | confirm receipt (data transmission) | F8 | X |
| ⚡I | transmit to participants in radio circuit I | F9 | X |
| ⚡II | transmit to participants in radio circuit II | F10 | X |
| M | memory manipulation | F11 | X |
| i | status / information, fix dispatcher | F12 | X |
| mod | modify entries in the map (symbols, lines) | Ins | X |
| X | delete symbols and / or lines or whole portions / layers | Del | X |

PORTABLE ELECTRONIC DEVICE

This is a continuation of application Ser. No. 08/202,170, filed Feb. 25, 1994, now abandoned.

The invention relates to a portable electronic device for orientation, information recording, information processing, information storing, and communication. Such devices are intended, for instance, to guide groups of persons, such as disaster control units or troop formations on the ground and to support their actions.

Such command assistance devices have been suggested for firm installation in vehicles of vehicle formations in U.S. application Ser. No. 046,950 filed Apr. 15, 1993, entitled CONTROL SYSTEM FOR CONTROLLING VEHICLES, and assigned to the assignee hereof (EP-A-567 660).

There is a need to equip also persons or groups of persons, for example, of a military or disaster control unit operating independently of vehicles, with such devices so as to speed up and improve the recording and exchange of information between the command and the persons of the unit guided by the commanders as well as among the persons themselves.

DE 38 17 620 A1 discloses a measuring instrument for measuring objects; here a small computer is housed exchangeably in a casing to be protected from environmental influences, such as moisture or dirt.

Likewise known is a portable electronic device in the form of a small suitcase (DE 88 01 332 U1) one half of which firmly houses a microcomputer including an operating and display portion, while the other half firmly houses a printer and a data transmitting means. A connection via mains must be established for communication with a stationary mainframe.

It is the object of the invention to provide a portable electronic device to be handled by individuals of a group or unit, permitting the person or the group to get quick orientation in terrain, rapid information about the kind, place, movement, and extent of a threat, as well as permitting an exchange of information, e.g. for exchanging logistic information in accordance with the function key table of FIG. 11 with other persons of the group or unit and/or with a commander agency for the unit, with or without use of an electric network. At the same time, the computer and other electronic assemblies of the device are to be protected effectively against electromagnetic radiation of any kind as well as against the penetration of moisture, dust, and dirt.

Claim 1 serves to solve this problem.

The computer may be provided as a computer board firmly installed in the device. It may also be removable from the device and operable independently of the same. Finally, the computer may be designed as a so-called note pad computer and may be docked removably to the docking station from outside. In this case the orientation sensors are not integrated in the casing, in contrast to the two aforementioned possibilities.

What all embodiments have in common is a terminal node controller which controls the changeover between data and speech transmission, either via radio or an internal or official network.

It is an important advantage of the device according to the invention that a commercially available computer (or a computer board) to be obtained cheaply because of the great numbers of such computers (laptop, notebook, note pad computers) can be used in the device which is easily transportable by a person and, due to the exchangeability of the computer, allows always to utilize the most efficient version of such a computer and thus the most recent state of computer technology without excessive cost expenditure.

Furthermore, the modular structure of the device permits the computer, which preferably is separable from the casing, to be operated independently of the device, for example in protected surroundings of an observation point.

In the case of an embodiment of the invention which includes a separate operating and display module permanently housed in the casing, this module is designed for operation in rough surroundings with the cover shell of the suitcase opened. To this end, the cover shell of the device merely has to be opened so that the computer which disposes of a suitable operating and/or screen surface remains fully closed and protected in the lower shell.

The portable computer is preferable, useful also as a central processing unit in a vehicle, for which purpose it merely has to be taken out of the device and attached by way of an electrical-mechanical interface to a docking station fixed to a vehicle.

Further advantageous modifications of the invention are indicated in the subclaims.

The invention will be described further, by way of example, with reference to diagrammatic drawings, in which:

FIG. 4 is a diagrammatic presentation of the transfer of a computer of the portable device into an assembly which is fixed to a vehicle;

FIG. 11 is an example of designating function keys of a computer of the device according to the invention;

Figure 1:
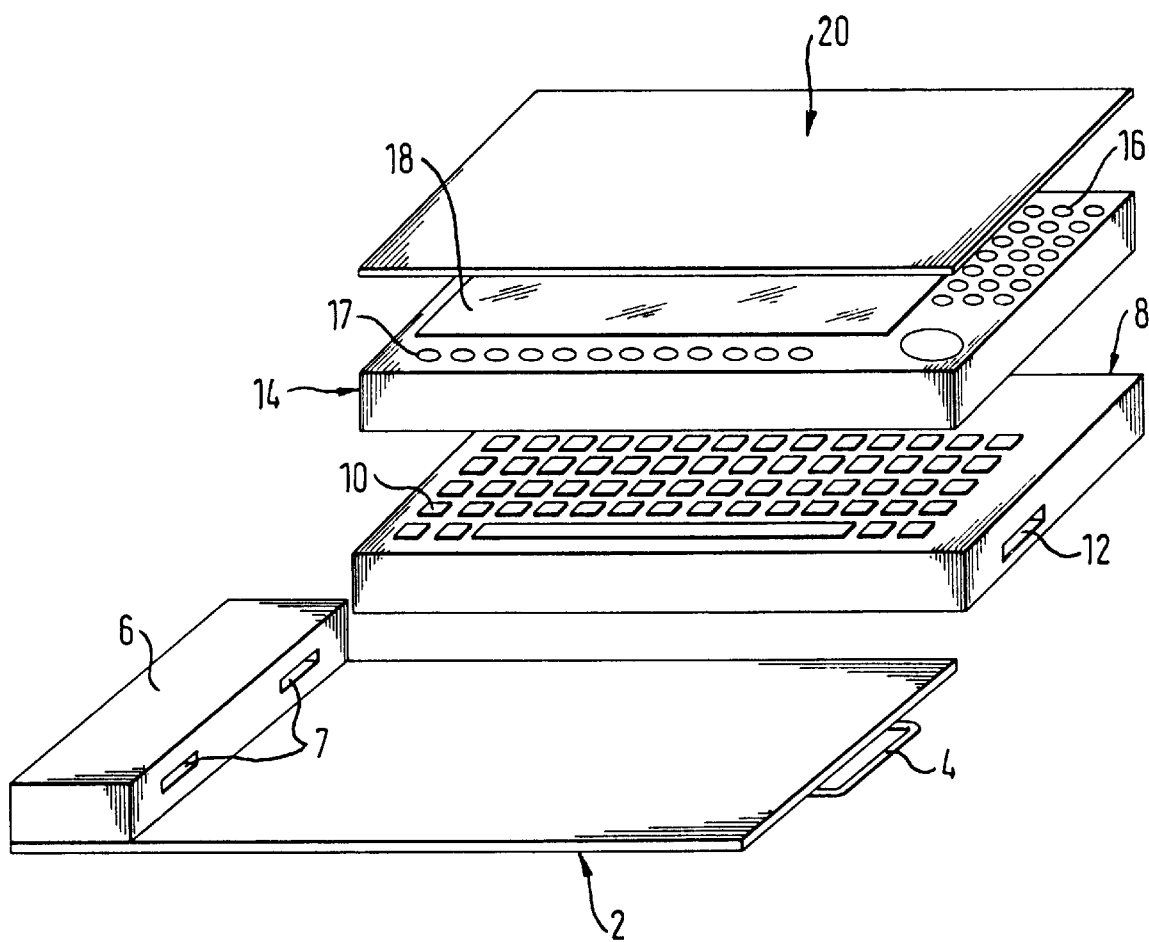
FIG. 1 is an exploded view of the components of a portable electronic device according to the invention in a first embodiment.

The illustration in FIG. 1 schematically shows the components of a portable device according to the invention, namely a baseplate 2 including a handle 4 and a docking station 6, a computer 8 with an integrated operating surface (keyboard) 10 and a write/read unit having a slit 12 for insertion of semiconductor memory cards, and a screen, if desired, (not realized here), an operating and display module 14 including key pad 16, 17 and screen 18, as well as a cover 20.

The computer 8 and the operating and display module 14 are connectable electrically and mechanically to the docking station 6 by plug connectors indicated for the computer at 7.

This docking station 6 comprises a battery, a radio adapter, a satellite supported navigation instrument (GPS) and perhaps a digitial compass (not shown).

The computer 8 comprises a memory in which, for instance, an electronic map is stored which is adapted to be displayed on the screen 18 together with symbols of one's own position and the (changing) positions of members of the unit or foreign forces.

The operating and display module is designed for rough operation so that it will not suffer damage from influences of the weather or from contamination when the cover 20 is removed or swung open in operation. During such operation the operating and display module 14 covers the computer 8 so that the latter is protected all around in the device.

It is apparent that the assemblies of the device according to FIG. 1 are of modular design and individually exchangeable.

Figure 3:
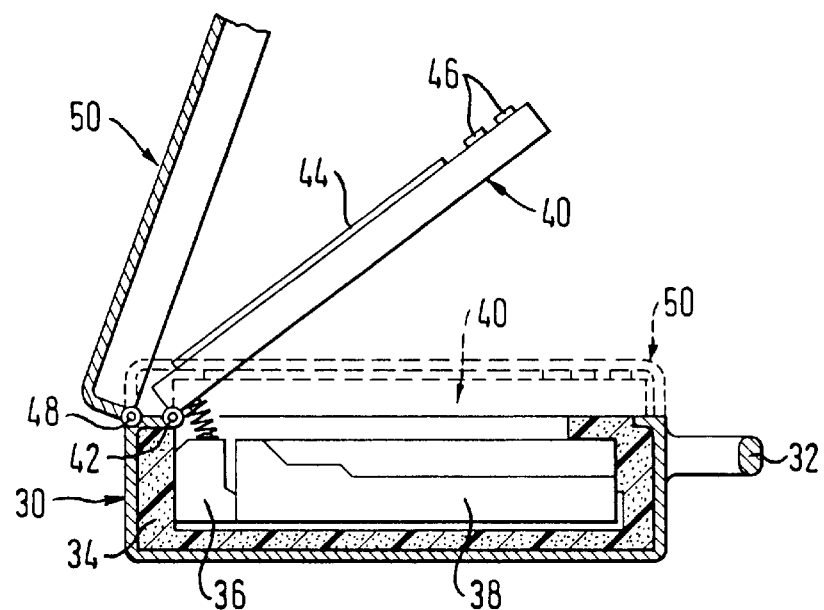
FIG. 3 is a section along line III—III of FIG. 2 and shows the device in unfolded operative condition.
Figure 2:
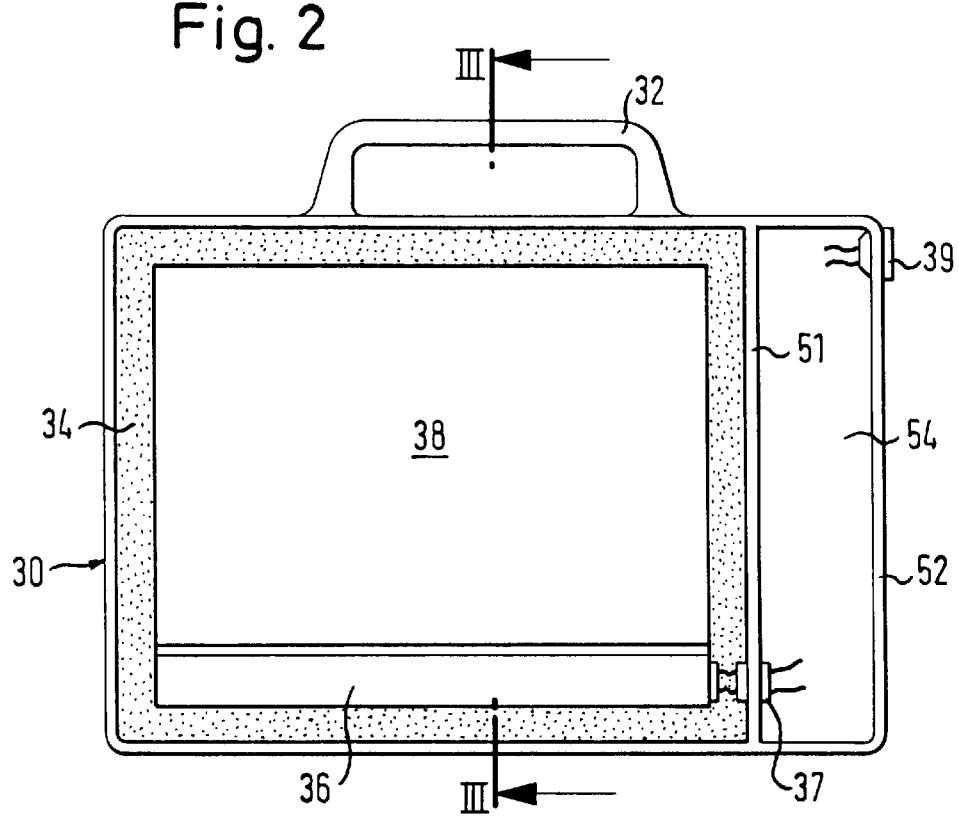
FIG. 2 is a sectional view of a portable device according to the invention in a second embodiment.

In the case of the embodiment according to FIGS. 2 and 3 the device is made in the form of a suitcase having a lower shell 30 with a handle 32. The lower shell is lined by shock absorbing material 34, e.g. foamed plastics in which a docking station 36 and a notebook computer 38 are protectedly received. An operating and display module 40 is pivoted by means of a hinge 42 above the receiving opening of the lower shell 30 such that it will cover the opening when in folded-down state (shown in discontinuous lines in FIG. 3) thereby fully enclosing the computer 38 as well as the docking station 36 and protecting them from external influences. The operating and display module 40 has a screen 44 and an input keyboard 46 on its top surface. At the upper outer edge of the lower shell 30 a cover shell 50 is pivoted by means of a hinge 48 such that it fully covers the operating and display module 40 when in closed state (shown in discontinuous lines in FIG. 3).

In this case a write/read unit with a slit for insertion of semiconductor memory cards is disposed in the operating and display module 40 (not shown here).

The computer 38 preferably is a commercially available, comfortable laptop or notebook computer which can be taken out of the device and thus be used autonomously in a protected environment, e.g. a commanding control center, a staff agency, or the like. This computer 38, therefore, can be replaced by the respective most efficient one or by a computer adapted to the performance needed.

It becomes clear from FIG. 2 that the docking station 36 in this case merely serves to establish the mechanical and electrical connections between the computer 38 and the operating and display module 40. Further components, such as radio adapters, satellite navigation instrument, digital compass, write/read unit for semiconductor memory cards, etc. are housed in a separate casing portion 52 in a side compartment 54 of the suitcase separated by a partition 51 and adapted to be connected to the docking station 36 by an electrical connection 37 in the partition. Another electrical plug connection 39 may be passed from the compartment 54 to the outside so that, for example, another similar device may be connected by a short cable.

The top in FIG. 4 shows the device according to FIG. 3 with an open cover shell 50 and with the operating and display module 40 swung upwardly so that the computer 38, illustrated separately underneath, can be taken out. It is insertable into an electrical-mechanical interface 62 firmly installed in a vehicle 60 and, thereupon, may serve as a central processing unit of an assembly in the vehicle to record, process, memorize, and supply information, the assembly fixed to the vehicle comprising a vehicle system 64, a radio unit 66 for speech and data transmission, an operating and display unit 68, and a navigation system 70.

Figure 5:
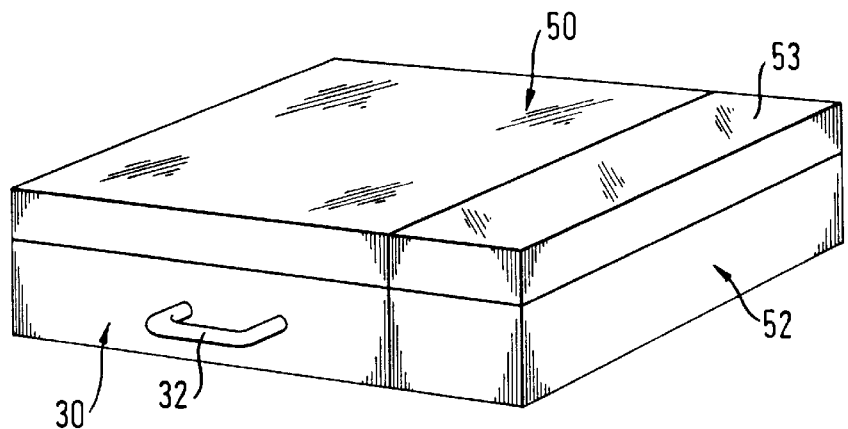
FIGS. 5 and 6 show a variant comprising a casing portion which is detachably disposed at the casing to take up additional components.
Figure 6:
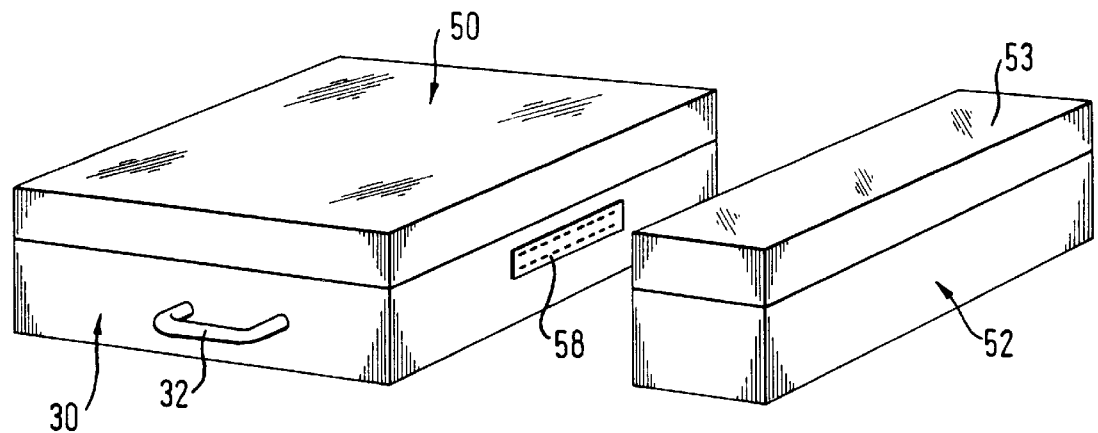

In the case of the variant according to FIGS. 5 and 6 in which the same or equivalent parts are designated by the same reference numerals as in FIGS. 2 to 4, the casing portion 52 with the separate compartment 54 containing components, such as radio adapter, satellite navigation instrument, digital compass, etc. is adapted to be coupled by way of an electrical-mechanical plug connection 58 to the remaining casing portion, including lower shell 30 and cover shell 50. Thus the casing portion 52 provided here with a separate cover member 53 and a handle of its own (not shown) can be handled separately of the remaining casing portion, if required, and can be linked again to the device by simple plugging and locking to form a mechanical and functional unit.

Figure 7:
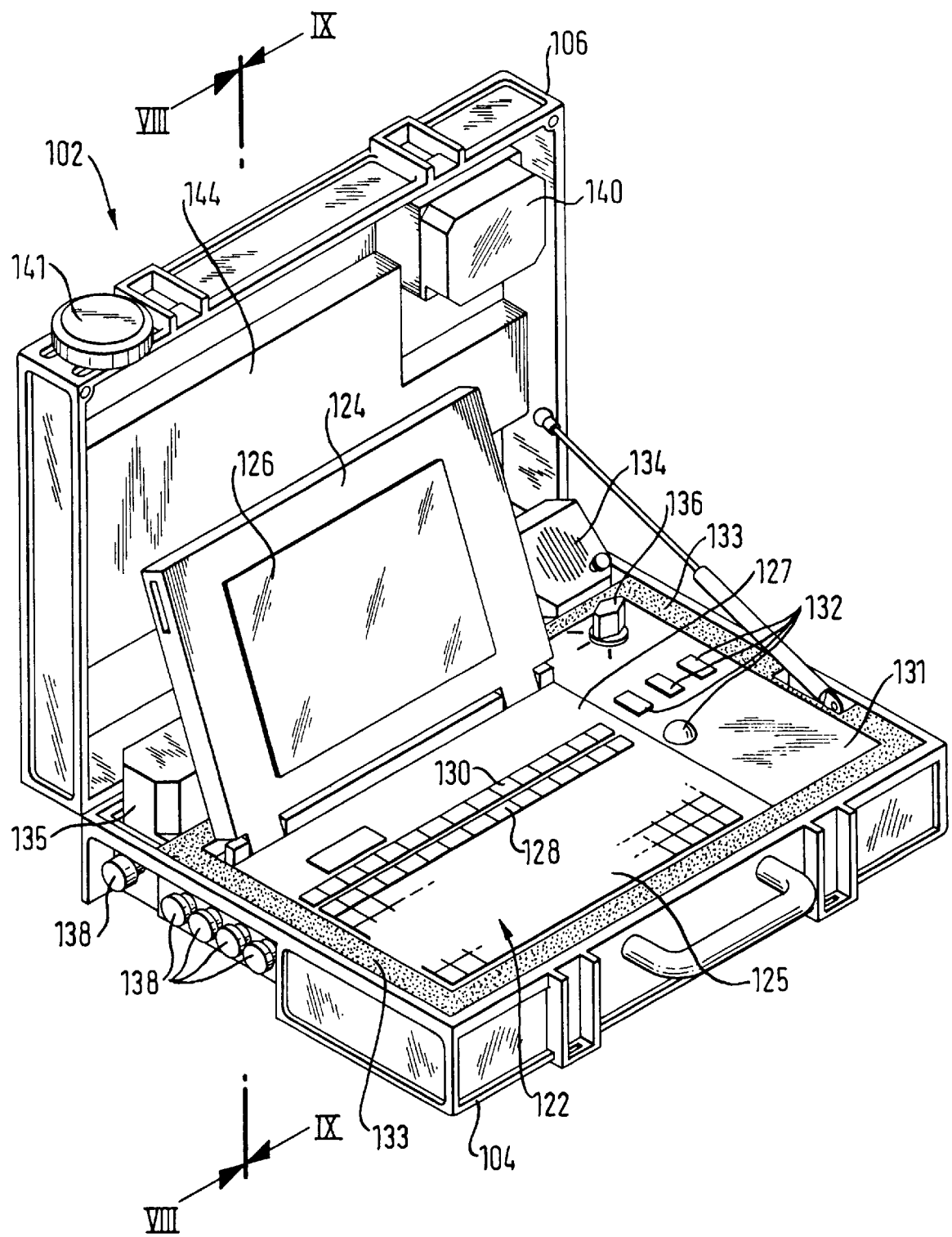
FIG. 7 is a perspective view of another embodiment of a device according to the invention, showing it swung open.
Figure 8:
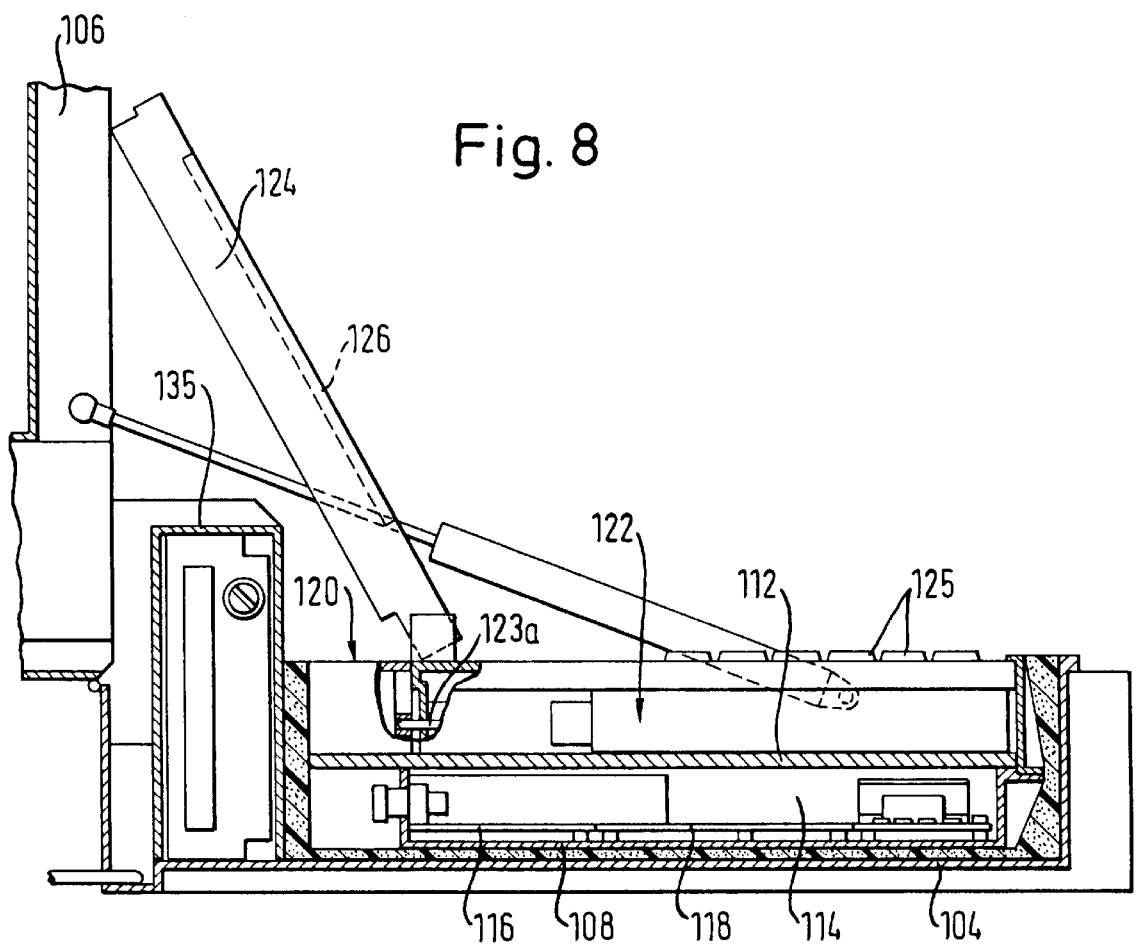
FIG. 8 is a part sectional view of the device in the direction of arrows II—II in FIG. 7.
Figure 9:
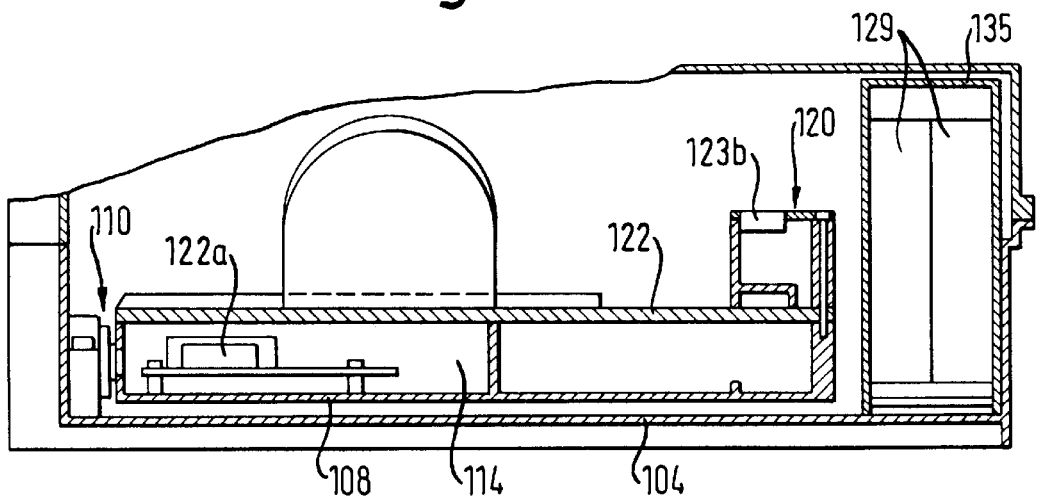
FIG. 9 is another part sectional view of the device in the direction of arrows III—III in FIG. 7.

The essential components of another electronic device according to the invention for command support, comfortably portable by a person, are to be seen in FIGS. 7 to 9. An inner casing 108 made of a chromated aluminum alloy, best to be taken from FIGS. 8 and 9, is suspended by shock absorbers 110 (FIG. 9) in an outer casing designated generally by reference numeral 102 and comprising a lower part 104 and a cover 106. The inner casing 108 comprises an inner space 114 which is covered at the top by a cover 112 and houses electronic assemblies of the device that may be disposed, at least in part, on printed circuit boards 116, 118 and will be described below with reference to FIG. 10. The inner space 114 is protected against the entry of damaging influences, such as moisture, dust, electromagnetic radiation of any kind, and vibrations by virtue of the chromating of the inner casing 108, the sealing of the cover 112, and the shock absorbing suspension. This is true also of a docking console 120 which forms another part of the inner casing 108 and can be seen, in FIG. 8, at the left end of the inner casing 108 and at the right end thereof in FIG. 9.

Figure 10:
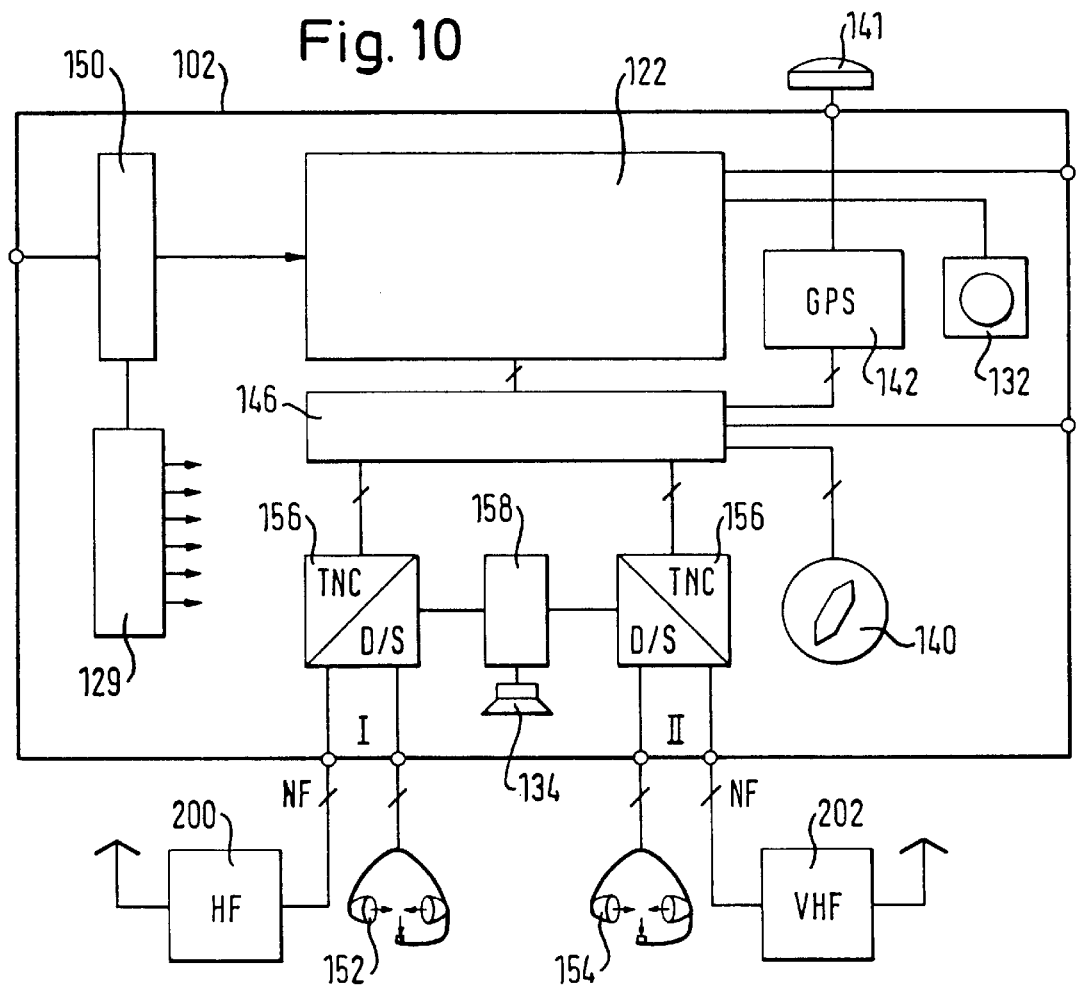
FIG. 10 is a circuit diagram of the components of the device according to FIGS. 7 to 9.

The docking console 120 serves for mechanical and electrical connection of a commercial laptop or notebook computer 122 for which the cover 112 of the inner casing 108 presents a support surface. According to FIG. 8, the computer 122 is firmly inserted laterally into the docking console 120 by console plugs 123a provided at the computer, while the connection to the interface adapter 146 according to FIG. 10 is effected by plugs 123b at the upper edge of the docking console 120.

In FIGS. 7 and 8 the computer 122 is shown unfolded; in FIG. 7 a color LCD screen 126 becomes visible at the inside of the computer cover 124. The computer 122 has an operating surface including a key pad 125 whose uppermost row 128 is formed of a total of fifteen function keys. The key pad is protected from dust by means of a transparent film placed on top. In a row 130 of corresponding matrix disposed above on the computer console 127, the function keys of row 128 are provided with marks containing symbols for command support functions, as illustrated in the left column of FIG. 11.

A continuous dust seal of foam is marked 129. Two accumulators 129 are housed in a box 135 behind the computer 122 and the docking console 120.

Reference numeral 132 designates a control ball 132 and further function keys for operation of the computer 122, and 136 designates a three-stage switch for channel selection for radiotelephony. These operating elements are arranged on the outside of a flap 131 which is hinged for upward swinging movement behind the switch 136 and in front of a loudspeaker 134 and extends past the key pad 125 up to the front inside edge of the outer casing 102 to cover a room next to the rear side edge in FIG. 7 of the computer, through which a diskette is insertable into a lateral diskette introduction slit 122a (FIG. 9) of the computer.

The software needed for guidance and described, e.g. in the paper "IFIS, ein uberzeugendes Konzept" by S. Birkeneder, W. Hedwig, and K.-H. Wiemer in the journal "Wehrtechnik", vol. 8, 1993, pages 1 to 7, is stored on a hard disc in the computer 122.

Connecting plugs 138 for current supply, for external connections from a parallel interface and an interface RS 232, connections for VHF and HF radio, as well as two connections for headphones and microphones are designated accessible from the outer casing 102. These assemblies and their electrical interconnection are shown in FIG. 10 and will be described below with reference to this figure.

A digital compass 140 is connected by a plug connection at the cover 106 of the outer casing 102, it is designed to be removable, yet adapted to be plugged to a sight device not illustrated here, like a telescope, while remaining in connection with the device by means of cables (not shown). The plugin antenna 141 of the receiver part 142 of a satellite navigation system (GPS) is arranged at the outside of the casing. An acessory bag 144 accessible from outside is received in the cover 106.

The electrical interconnection of the parts described may be taken from FIG. 10. Reference numeral 146 designates an interface adapter, reference numeral 129 designates accumulators for autonomous power supply, reference numeral 150 designates supply control, reference numerals 152, 154 microphone headphone combinations for receiving and transmitting HF or VHF radio via radio sets 200, 202, reference numeral 156 designates two terminal node controllers, and reference numeral 158 designates an interphone distributor connected upstream of the loudspeaker 134. The electronic assemblies 150, 146, 142, 156, and 158 all are housed in the inner space 114 of the inner casing 108, protected against disturbing and damaging influences, such as electromagnetic radiation, moisture, dust, and vibrations.

Figure 12:
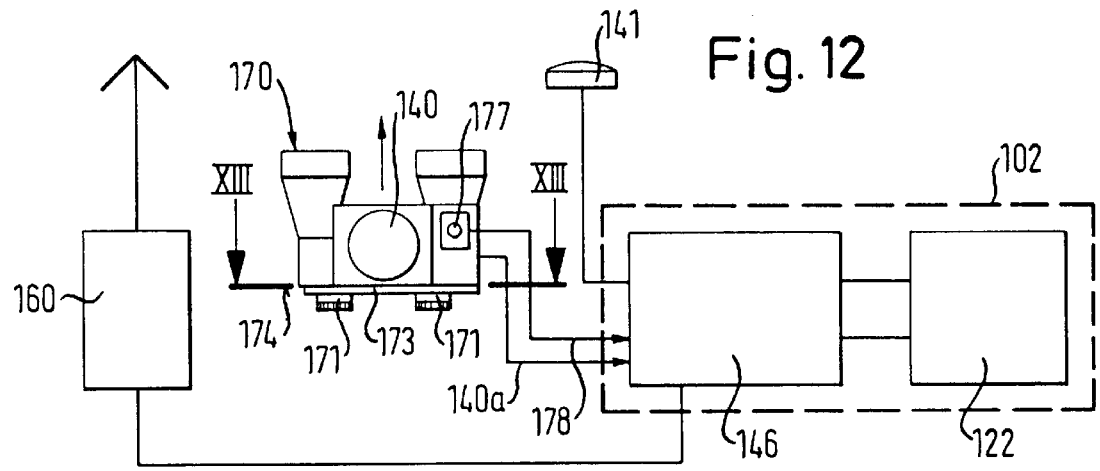
FIG. 12 is a diagrammatic illustration of another modification of the device according to the invention.
Figure 13:
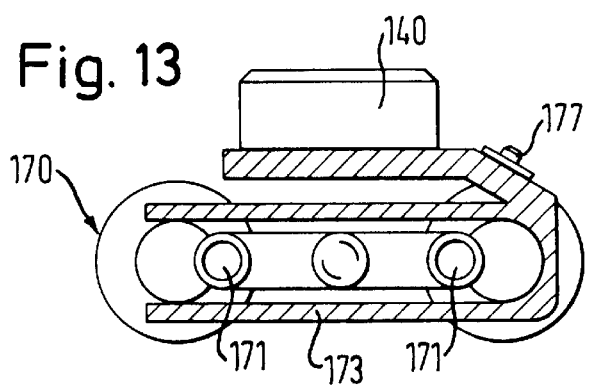
FIG. 13 is a section along line XIII—XIII of FIG. 12.

FIGS. 12 and 13 illustrate a further modification of the invention. As in FIGS. 7 to 10, an outer casing according to the invention is designated in general by reference numeral 102, and again reference numerals 122 and 146 designate a removable, portable computer and an interface adapter. Here, too, reference numerals 140 and 141 designate the electronic compass and the plug-in GPS antenna. The electronic compass 140, when taken out of the casing 102, is electrically connected to the same by the cable 140a and, as shown in FIG. 12, slipped by a plug and socket means 173 on a binocular 170 including eyepieces 171, the surface 174 serving as a stop to align the compass 140 with the axis Z of the binocoular 170. Reference numeral 160 designates a transceiver for communication with similar devices of other persons of the unit.

The function of the modification according to FIGS. 12 and 13 will now be described with reference to the block diagram of FIG. 14.

The azimuth signal of the electronic compass 140 is fed through the interface 146 with the aid of the cable 140a to the interface adapter 146 and on to the computer 122. In the basic operating mode, the direction towards north emitted by the electronic compass 140 is represented by the screen 126 of the device in the form of a sight line 176 on a digital chart in which the home position 175 is entered. The technical apparatus in the form of hardware and software required to do that are described in U.S. application Ser. No. 046,950 (EP-A-567-660) For example, when searching the horizon by the binocular, the sight direction of the binocular 170, i.e. that of the observer is constantly displayed on the screen because the electronic compass 140 is connected to the binocular 170 by the cable 140a.

A switch 177 is mounted on the plug and socket means 173 and connected by another cable 178 to the computer 122. Upon actuation of the switch 177, the sight line 176 is "frozen" on the screen 126, i.e. it no longer follows the movements of the binocular 170 and the compass 140 but instead, for the time being, continues to indicate the direction it showed when the switch 177 was actuated. The user of the binocular actuated the switch 177, for instance, because at this moment he discovered an object of interest the direction of which he can now find in his electronic map with respect to his own position 175 based on the "frozen" sight line 176. This function be called "sight transfer" vü.

If a telemeter is provided, integrated in the binocular or separate from the same, the distance data determined are transferable directly to the sight line 176 so that, in addition to the direction, also the distance of the object can be read on the screen 126 in the form of a section 176a on the sight line 176.

Figure 14:
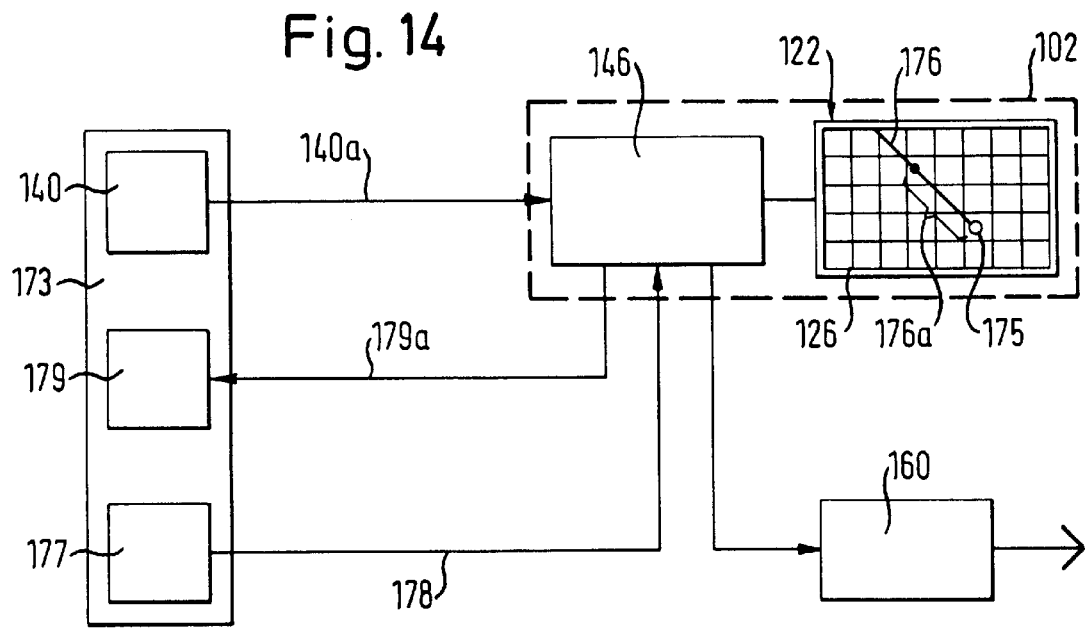
FIG. 14 is a block diagram to explain the function of the device according to FIGS. 12 and 13.

In addition, this modification according to FIGS. 12 to 14 can be used to carry out the further function of "sight allocation". To this end, the plug and socket means 173 shown simplified as a box in FIG. 14, by means of which the electronic compass 140 is connected to the binocular 170, is equipped with a sight allocation display 179 and connected by a cable 179a to the computer 122, indicating to the user by an acoustic or optical signal that he has directed the binocular into that direction toward north which agrees with a sight direction preselected in the device (computer 122). This preselection of direction is effected by the means described in EP-A-567 660. The advantage of the sight allocation resides in that it can be predetermined on the map (screen 126) in advance into which direction one must look through the binocular 170 in order to observe objects of interest which are presumed to be there.

The sight allocation display 179 and the switch 177 for actuation of sight transfer need not necessarily be connected to the plug and socket means 173. The display 179, for example, may be part of the device, and e. g. the loudspeaker 158 (FIG. 10) integrated in the device may be used for an acoustic indication signal. The switch 177 likewises can be a component part of the device; actuation in this case takes place to advantage by another person rather than the telescope user, e.g. upon call of the latter.

A means firmly connected to the binocular could be provided for retaining the members 140, 177, 179 instead of a plug and socket means 173 to be slipped on the binocular 170.

Figure 15:
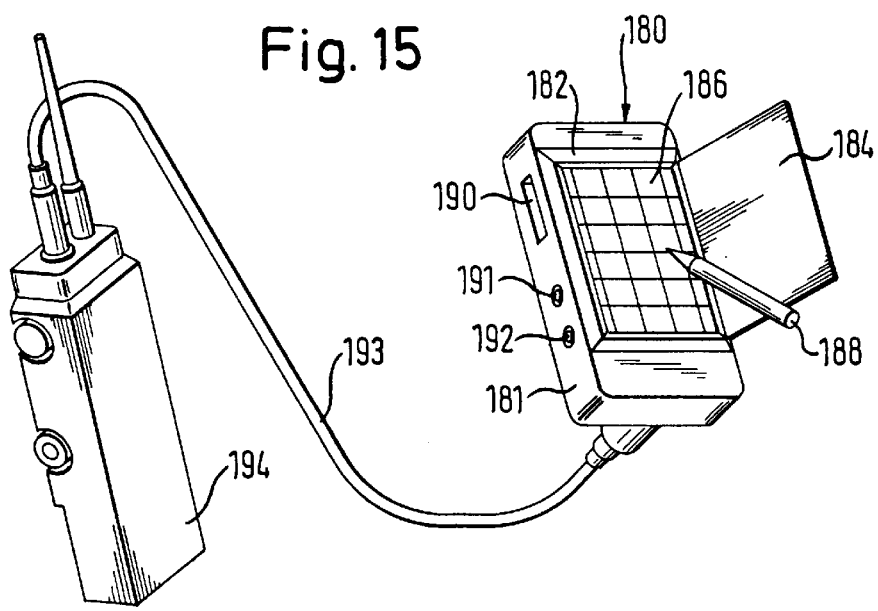
FIG. 15 is a perspective view of a simplified version of a device according to the invention.

FIG. 15 shows a particularly simple embodiment of the invention. Here a so-called note pad computer 182 is removably clamped by means of a snap connection and electrically connected in this state to the docking station 181 which contains the electronic assemblies of the device designated, in general, by reference numeral 180. The computer 182 includes a screen which is covered by a cover 184 and on which, for instance, a map presentation such as on the screen 126 according to FIG. 14 can be called and in which data can be written by means of an electronic writing pen 188. 190 designates an input slit for a data cassette. 191 is a socket for the plug-in antenna of a satellite navigation system and 192 a socket for a cable of an electronic compass. 194 designates a transceiver which is connected by the cable 193 to the basic casing 181 containing the control electronics and interface adapter of the device 180. contact can be established through the transceiver 194 to similar or superordinated devices, such as a device according to FIGS. 7 to 9.

If one adds to FIG. 15 a binocular with plugged on electronic compass, the same work can be done with the device according to FIG. 15 as described with reference to FIG. 14, and the diagram of FIG. 12 can be applied also to FIG. 15 if reference numerals 122 and 160 are replaced by reference numerals 182 and 194.

Figure 16:
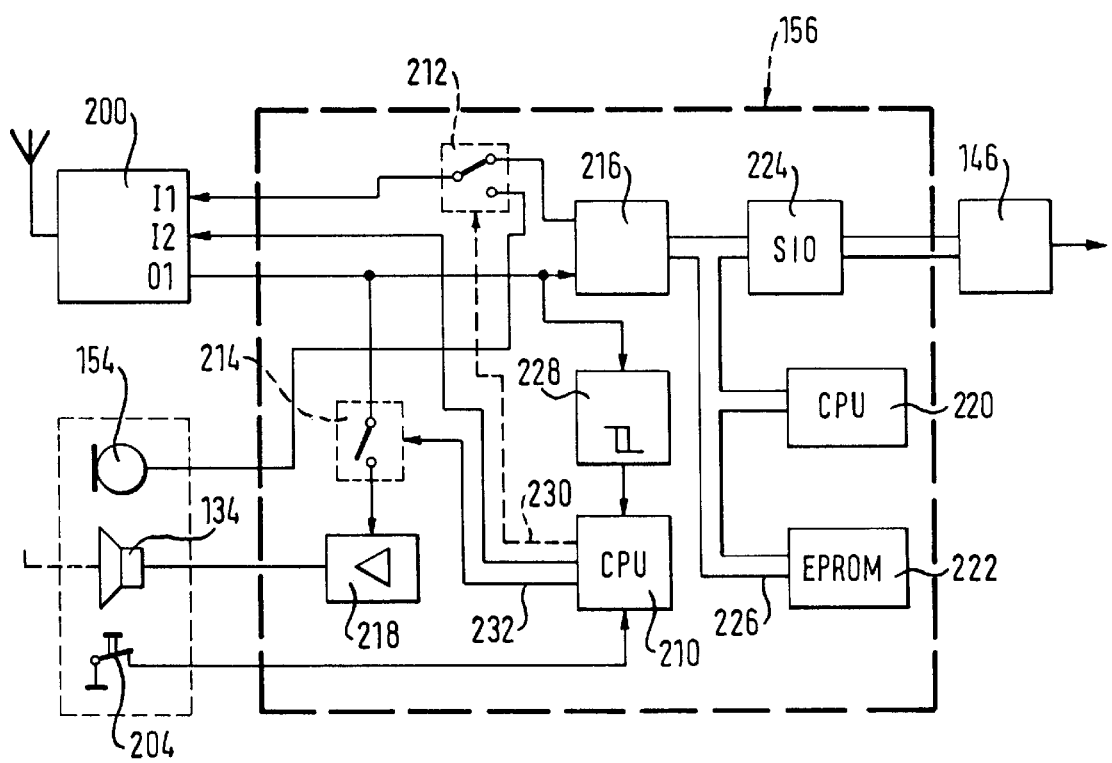
FIG. 16 is a circuit diagram showing in detail the structure of an assembly of the circuit diagram according to FIG. 10.

FIG. 16 illustrates a diagram of a terminal node controller (TNC) 156 used in the circuit diagram of FIG. 10. The TNC 156 serves for data transmission between peripherals and the computer and for speech transmission between peripherals, such as a radio set and speaking gear and for changeover between data signals and speech signals.

In FIG. 16 the TNC 156 is connected to the interface 146 which leads to the computer 22, the radio set 200, the microphone 154, the loudspeaker 134, and a PTT (push-to-talk) touch switch 204. The TNC 156 comprises a microprocessor 210 for recognizing speech signals and data signals, a first switch 212, a second switch 214, a low frequency amplifier 218, a modem 216, a microcontroller 220, a memory 222, and a serial input/output device (SIO) 224. The modem 216 is connected by a bidirectional bus 226 to the microcontroller 220, the memory 222, an EPROM in the embodiment illustrated, and via the SIO 224 to the interface 146 which, for example, may be a serial RS 232 standard interface or a V 24 interface. An output 01 of the radio set 200, on the one hand, is connected directly to the modem 216 and through a limiter-amplifier unit 228 to the microprocessor 210. On the other hand, it is connected through the second switch 214 and the amplifier 218 to the loudspeaker 234. An input I1 of the radio set 200 is adapted to be connected selectively to the modem 216 or the microphone 154 through the first switch 212. Moreover, the PTT touch switch 204 is connected to the microprocessor 210, one output of the microprocessor leading to another input I2 of the radio set 200. The first switch 212 and the second switch 214 each are connected to the microprocessor 210 through a control line 230 and 232, respectively.

The operation of the TNC 156 is as follows:

To transmit speech, a user of the device presses the PTT (push-to-talk) touch switch 204 in order to output a control signal to the microprocessor 210, indicating to the microprocessor that speech is to be transmitted. The microprocessor outputs a changeover signal (data→speech) through the control line 230 to the first switch 212 so that the latter will connect the microphone 154 to the input I1 of the radio set 200. Additionally, a control signal is emitted by the microprocessor 210 to the input I2 of the radio set 200 in order to switch on the speech transmitter of the radio set 200. The microphone 154 remains connected to the radio set 200 through the first switch 212 as long as the PTT touch switch 204 is pressed, and speech signals can be transmitted by the microphone. As soon as the user of the device lets go the touch switch 204, the first switch 212 returns, under control of the microprocessor 210, to the position illustrated in FIG. 16, interrupting the connection between the microphone 154 and the radio set 200 so that speech signals no longer can be transmitted.

Transmission of data always is possible when no speech signals are to be transmitted, i.e. when the PTT touch switch 204 is not pressed and the microprocessor 210 does not emit a changeover signal through the control line 230 to the first switch 212. In this case the modem 216 is connected to the input I1 of the radio set 200, and the transmitter of the radio set 200 is adjusted to transmit data signals.

An HDLC transmission protocol or another suitable control process for data transmission which warrants data safety, i.e. completeness and correctness of the data of the information to be sent is stored in the memory 222. The microcontroller 220 controls the passing of the information from the computer 22 through the interface 146 and the SIO 224 to the modem 216 and to the radio set 200 or from the radio set 200 through the modem 216, the SIO 224, and the interface 146 to the computer 22. A CRC code permits secure data transmission also if the radio channels suffer from noise, the transmission being assured by multiple transmission of the data packages until acknowledgement by the opposite station. Other methods of verification may be applied to control the input information.

The data to be communicated are modulated in the modem 216 so that they will be transmittable through the LF channel of the radio set 200. In order to reproduce the logic states "1" and "0" for the individual bits, switchover is effected between two frequencies, e.g. 1200 Hz for "0" and 2200 Hz for "1". The data streams or data packages thus modulated can be output to the radio set 200 until the user of the device interrupts the data transmission by means of the PTT touch switch 204 and the first switch 212 is changed over in order to transmit speech signals.

Upon receipt of speech signals or data signals, the TNC 156 first must recognize what kind of signal is at issue. To accomplish that, the signal received is applied through the limiter amplifier 228 to the microprocessor 210 which analyzes the signal received.

If it is a speech signal, that can be recognized by an irregular sequence of the most diverse signal frequencies. In this event the microprocessor 210 outputs a control signal through the control line 232 to the second switch 214 whereby the switch is closed and a connection established between the output 01 of the radio set and the loudspeaker 134 through the LF amplifier 218. The speech received then can be reproduced via the loudspeaker 134.

If, on the other hand, the radio set 200 receives a signal which, for a given time, comprises only the defined frequency for logic "0", for example 1200 Hz, or for logic "1", for example 2200 Hz, or a regularly varying sequence of these two frequencies, and passes it on to the microprocessor 210, the microprocessor recognizes that a data signal was received and outputs a blanking signal through the control line 232 to the second switch 214 in order to open this switch and break the connection between the radio sest 200 and the loudspeaker 134. The output 01 of the radio set 200 then only remains connected directly to the modem 216 to receive data signals.

The interruption of the connection between the radio set and the loudspeaker upon receipt of data signals is particularly convenient because the data frequencies received for "0" and "1" are identical in volume amplitude with speech signals, and that would cause great inconvenience to the user of the device upon amplification and output of these signals through the loudspeaker 134. For this reason, the TNC 156 was designed, as described, so that the disturbing sounds of the radio data transmission are automatically blanked at the receiving end. Special algorithms monitor the regularity of the successive frequencies so that speech syllables in this frequency range will not be blanked.

At a data rate of 1200 bits/second and a lower modulation frequency of, e.g. 1200 Hz, only one signal period is available, with certain data packages, for evaluating one bit each of the data package. Therefore, the sound assessment in such events cannot be accomplished by conventional simple means. Instead it is done with the aid of a microprocessor. If the microprocessor 210 has recognized with a certain number of successive periods that the only frequencies being received are those corresponding to the data signals, then these frequencies are blanked, i.e. the sound signals are not emitted by way of the loudspeaker 134 but instead transmitted to the modem 216. The modem 216 demodulates the frequencies received and passes on the information received through the bidirectional bus 226 to the microcontroller 220 for assessment and further transmission to the interface 146 and to the computer 22.

In view of the fact that radiotelephony always must be given priority over the transmission of data, it is assured in accordance with the criteria specified above and by using specific algorithms, that receipt and transmission of data via the radio set are possible only if the radio channel is not occupied by speech signals.

The features of the invention disclosed in the above specification, in the drawings and claims may be of significance, both individually and in any desired combination, to the realization of the invention in its various modifications.

What is claimed is:

1. A portable electronic device comprising:

support means;

a docking station carried by said support means;

a computer having a keyboard and a drive for a memory device adapted to be supported by said support means;

means for selectively effecting operable and mechanical connection of said computer to said docking station;

an operating and display module including a keyboard, a display device and a cover;

means for selectively effecting operable and mechanical connection of said operating and display module to said docking station, said support means and said operating and display module enclosing and thus providing protection for said computer even with the cover of said operating and display module in the open position for the manual use of the keyboard and viewing of the display device of said operating and display module.

2. The electronic device of claim 1 wherein said docking station includes a battery, means for receiving wireless information from a remote source, a satellite supported navigation system and a directional compass.

3. The electronic device of claim 1 wherein said computer includes means for storage of a map whereby the map with the location and direction of movement of the electronic device superimposed on the map displayed on the display device of said operating and display module.

4. A portable electronic device comprising:

a lower shell having a handle and being lined with a shock adsorbing material;

a notebook computer adapted to be received within said lower shell;

a docking station adapted to be received within said lower shell;

an operating and display module pivotally carried by said lower shell to fully enclose said notebook computer and said docking station when said notebook computer and said docking station are received in said lower shell and when said operating and display module is in a closed position with respect to said lower shell, said operating and display module having an upper surface including a keyboard, a screen and a drive for a memory device; and a cover shell pivotally connected to said lower shell to fully enclose, when in a closed position with respect to said lower shell, said operating and display module when said operating and display module is in a closed position with respect to said lower shell.

5. The electronic device of claim 4 wherein said lower shell includes an internal dividing wall separating a first area where said computer and said docking station are received from a second area, said wall having a plural pin connector therethrough, said second area including means adapted for connection to said connector for receiving wireless information from a remote source and a satellite supported navigation system.

6. The electronic device of claim 4 wherein said lower shell includes a plural pin connector exposed at an exterior thereof; and including a casing having a handle and a plural pin connector conFIGured to mate with the connector of said lower shell exposed at an exterior surface of said casing, said casing including means for receiving wireless information from a remote source and a satellite supported navigation system.

7. A portable electronic device for orientation and communication, the device comprising:

a lower shell for receiving a programmable and separably operable computer having a keyboard and a display, said lower shell having at least one parallel or serial interface with said computer, a shock absorbing suspension for attaching said computer within said lower shell, a cover shell hingedly attached to and mateable with said lower shell such that said cover shell may be closed upon said lower shell to form an enclosure for said computer, and an inner casing including a keyboard and a display enclosing said computer and protecting said computer against outside influences of electromagnetic radiation, dust, and vibrations.

* * * * *